United States Patent
Kim

(10) Patent No.: US 7,705,833 B2
(45) Date of Patent: Apr. 27, 2010

(54) DISPLAY DEVICE AND METHOD OF MOBILE TERMINAL

(75) Inventor: Sang-Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/937,250

(22) Filed: Nov. 8, 2007

(65) Prior Publication Data
US 2008/0158189 A1  Jul. 3, 2008

(30) Foreign Application Priority Data
Dec. 29, 2006  (KR) ...................... 10-2006-0139112

(51) Int. Cl.
*G06F 3/041* (2006.01)
(52) U.S. Cl. .................... 345/173; 455/566; 715/779
(58) Field of Classification Search ............... 715/201, 715/212, 784, 718, 835, 974, 864, 833, 825, 715/779, 838; 345/713, 179, 173, 158; 455/566
See application file for complete search history.

(56) References Cited

U.S. PATENT DOCUMENTS

| | | | | |
|---|---|---|---|---|
| 5,563,996 | A * | 10/1996 | Tchao | 715/201 |
| 6,317,141 | B1 * | 11/2001 | Pavley et al. | 715/732 |
| 6,337,698 | B1 * | 1/2002 | Keely et al. | 715/823 |
| 6,874,128 | B1 | 3/2005 | Mooe et al. | |
| 7,328,411 | B2 * | 2/2008 | Satanek | 715/786 |
| 7,388,578 | B2 * | 6/2008 | Tao | 345/173 |
| 2003/0080947 | A1 | 5/2003 | Genest et al. | |
| 2004/0015548 | A1 * | 1/2004 | Lee | 709/204 |
| 2006/0005131 | A1 | 1/2006 | Tao | |
| 2007/0035616 | A1 * | 2/2007 | Lee et al. | 455/41.2 |
| 2007/0146339 | A1 * | 6/2007 | Yang et al. | 345/173 |
| 2007/0252822 | A1 | 11/2007 | Kim et al. | |

FOREIGN PATENT DOCUMENTS

| | | |
|---|---|---|
| DE | 10 2004 023 198 A1 | 12/2005 |
| EP | 0 841 609 A2 | 5/1998 |
| KR | 2007-0106888 A | 11/2007 |
| WO | WO-2006/092464 A1 | 9/2006 |
| WO | WO-2006/094308 A2 | 9/2006 |

OTHER PUBLICATIONS

German Office Action dated Jun. 19, 2008.

* cited by examiner

*Primary Examiner*—Kevin M Nguyen
(74) *Attorney, Agent, or Firm*—Birch, Stewart, Kolasch & Birch, LLP

(57) ABSTRACT

A mobile terminal and its display method are discussed. According to an embodiment, the mobile terminal includes a display unit of a touch screen type divided into at least one of first and second display regions; and a controller that performs a particular function or re-adjusts a divisional boundary between the first and second display regions according to a user's instruction sensed from the display unit, wherein the display unit displays a movable menu bar that partitions the first and second display regions.

17 Claims, 8 Drawing Sheets

DISPLAY DEVICE AND METHOD OF MOBILE TERMINAL

This application claims the priority benefit of Korean Patent Application No. 10-2006-0139112, filed on Dec. 29, 2006, which is hereby incorporated by reference for all purposes as if fully set forth herein.

BACKGROUND OF THE INVENTION

1. Field of the Invention

The present invention relates to a display device and method of a mobile terminal equipped with a touch screen.

2. Description of the Related Art

A touch screen is a device that directly inputs data or a command through a screen without using a key board. When a user's hand or an object (e.g., a stylus) comes in contact with a particular character appearing on the screen or a particular position, the corresponding position is sensed and a predetermined program is executed.

The touch screen is fabricated by attaching a touch panel on a screen of a general monitor, and in the touch panel, infrared rays flow horizontally and vertically on the screen to generate numerous infrared square lattices. When the user touches the screen with the stylus or a finger, the touch is sensed through the infrared lattices and the corresponding position is recognized.

Thus, when the user touches a character or a figure outputted (displayed) on the touch screen, position information of the touched portion is transferred to a controller, and the controller recognizes the user's selection according to the position information and performs a relevant operation or function. By mounting the touch screen on the terminal, required information can be more easily and quickly provided to the user.

In view of such user convenience, touch screens are implemented in terminal devices (that provide guidance or announcements) in crowded public areas such as subways, department stores, banks, etc., or implemented in terminal devices for sale to be used by consumers. In addition, the touch screen is utilized as a display of a mobile terminal, such as a PDA (Personal Digital Assistant) or a cellular phone.

However, because the mobile terminal is small and a considerable portion of its body is occupied by a keypad, a space for mounting a display device is limited.

Thus, in order to satisfy the user's demand for a larger screen, terminal manufacturers have manufactured mobile terminals such that the keypad is operated by software, omitting hardware, on the touch screen. In this case, however, the use of the large display device is not much effective, and execution of a terminal function or menus is complicated, causing user inconvenience.

SUMMARY OF THE INVENTION

Therefore, in order to address the above matters and others, the various features described herein have been conceived. One aspect of the exemplary embodiments of the present invention is to provide a touch screen display device of a mobile terminal that is divided into multiple display regions in use, and a display method thereof.

Another aspect of the exemplary embodiments is to provide a display device and method of a mobile terminal having a movable menu executing user interface.

Another aspect of the invention is to provide a mobile terminal and its display method, which address the limitations and disadvantages associated with the related art.

This specification describes a mobile terminal according to one embodiment, which includes: a display unit of a touch screen type divided into first and second display regions; and a controller that performs a particular function or re-adjusts (re-controls) a divisional boundary between the first and second display regions according to a user's instruction sensed from the display unit, wherein the display unit displays a movable menu bar that partitions the first and second display regions.

According to an embodiment, the present invention provides a display method of a mobile terminal including a display unit, comprising: sensing a user's instruction through a touch screen of the display unit; newly displaying first and second display regions on the touch screen by using a moved position of a menu bar as a divisional boundary between the first and second display regions when the movement of the menu bar is sensed; and controlling the display unit according to a function of a particular button on the menu bar when touching of the particular button is sensed.

According to another embodiment, the present invention provides a mobile terminal comprising: a touch screen including at least first and second display regions, and a menu bar for dividing the touch screen into the first and second display regions, wherein the menu bar is positioned on the touch screen to correspond with a user's contact movement on the touch screen; and a controller to control the touch screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The preferred embodiments of the present invention have been developed to mount a touch panel that senses a movement of a movable menu bar, which can be moved in its position, displayed on a screen of a mobile terminal and to control a screen division ratio according to the movement of the menu bar.

Exemplary embodiments of the present invention will now be described.

Figure 1:
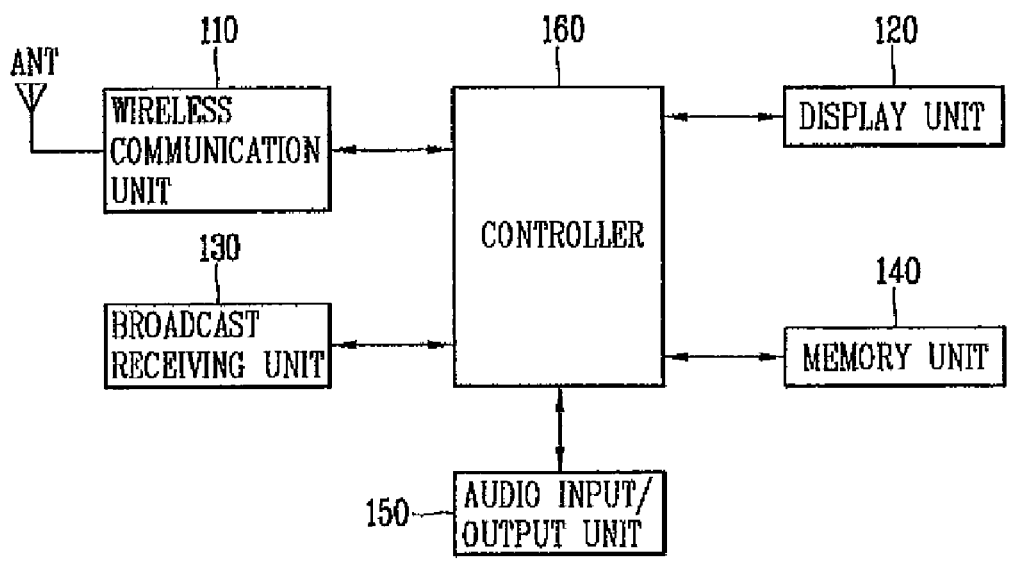
FIG. 1 is a schematic block diagram of a mobile terminal according to an exemplary embodiment of the present invention.
Figure 2A:
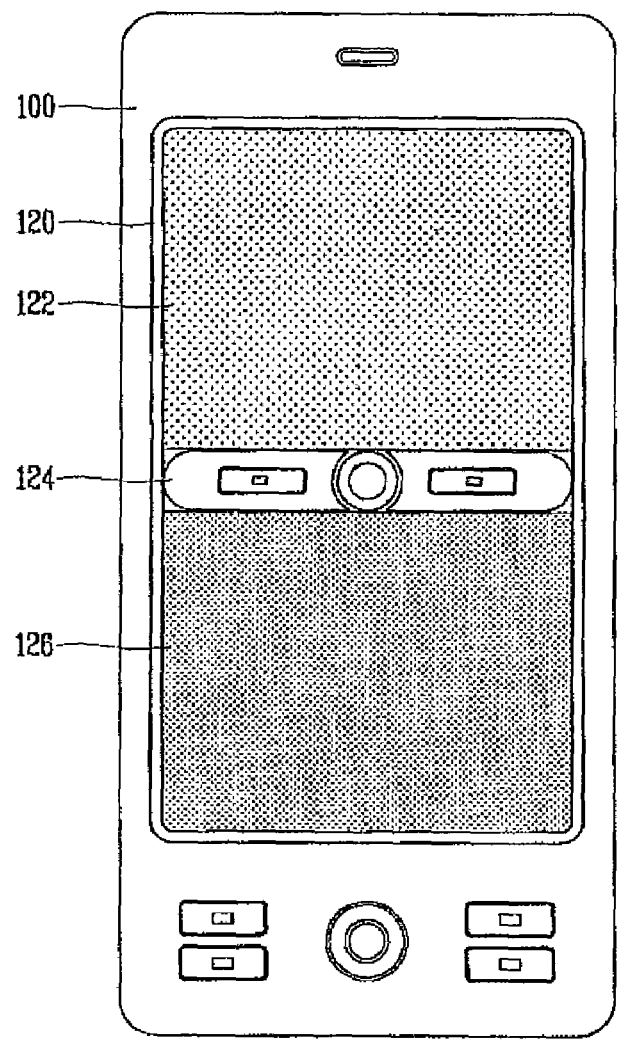
FIG. 2A is a view showing one example of a screen configuration of the mobile terminal according to the exemplary embodiment of the present invention.
Figure 2B:
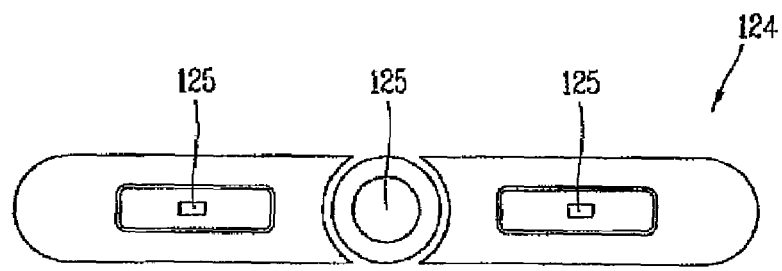
FIG. 2B is a view showing one example of a menu bar displayable on the mobile terminal according to the exemplary embodiment of the present invention.

FIG. 1 is a schematic block diagram of a mobile terminal according to an exemplary embodiment of the present invention, FIG. 2A is a view showing an example of a screen configuration of the mobile terminal according to the exemplary embodiment of the present invention, and FIG. 2B is a view showing an example of a menu bar according to the exemplary embodiment of the present invention.

With reference to FIG. 1, a mobile terminal 100 includes a wireless communication unit 110 that performs wireless communication, a display unit 120 that displays a state and a result according to an operation of the mobile terminal 100, a broadcast receiving unit 130 that receives a broadcast signal such as a DMB signal, a memory unit or storage unit 140 that stores various information, an audio input/output unit 150 that receives and outputs a voice signal and an audio signal, and a controller 160 that controls operations of each element of the mobile terminal 100. The mobile terminal 100 may include other known components, and all the components of the mobile terminal 100 are operatively coupled and configured.

The wireless communication unit 110 receives or transmits a wireless signal (radio signal) through an antenna ANT. The wireless signal includes data in the form of voice, image, video and text, etc. The wireless communication unit 110 includes a transmitting unit that modulates a signal to be transmitted and transmits it through the antenna ANT and a receiving unit that demodulates a received signal. The transmitting unit and the receiving unit may be separately entities or may be integrated into one unit.

The display unit 120 is preferably implemented as a touch screen combining a touch panel that senses a touch and outputs corresponding position information and an LCD (Liquid Crystal Display) that displays various menu screen images and certain images. As a variation, the display unit 120 may include one or more displays (e.g., LCDs, OLED screens, etc.), where each display may include a touch screen. Thus, in the present disclosure, the display unit 120 is used as an input unit for receiving a user instruction as well as used as an output unit for displaying data. In other words, the mobile terminal 100 in the present disclosure receives user instructions and displays various menu screen images and other images by using the touch screen.

As shown in FIG. 2A, the display unit 120 is divided into a first display region 122 and a second display region 126, and displays a movable menu bar 124 that partitions the boundary of the first and second display regions 122 and 126. Although two display regions 122 and 126 and one menu bar 124 are shown, the present invention encompasses having more than two display regions separated by more than one menu bar. As shown in FIG. 2B, the menu bar 124 includes one or more menu buttons 125 that are used to execute functions and/or menus of the mobile terminal. The menu bar 124 is an image displayed on the touch screen of the display unit 120 and thus can be represented in a different color, format, shape, size, configuration, etc.

In the present invention, as shown in FIG. 2A, the menu bar 124 is a horizontal menu bar that partitions up and down the display region of the display unit 120, but without being limited thereto, can be a vertical menu bar (not shown) that may partition the display region of the display unit 120 left and right. Further, the mobile terminal 100 may be rotatable such that the screen of the display unit 120 may be viewed by the user in the rotated position. In such case, the menu bar 124 may be switched from the vertical to the horizontal one or from the horizontal to the vertical one.

The broadcast receiving unit 130 receives a broadcast signal and/or various broadcast-related information transmitted through a satellite or a ground base station under the control of the controller 160.

The memory unit 140 stores a general program required and/or used for an operation of the mobile terminal 100 and various data. In addition, the memory unit 140 stores data generated as the mobile terminal 100 performs its functions. The memory 140 can be implemented as an internal memory mounted within the mobile terminal 100 or/and as an external memory that can be portable and detachably mounted on the mobile terminal 100.

The audio input/output unit 150 includes a microphone that receives a voice signal or an audio signal and a speaker that outputs an audio signal and a voice signal generated according to an operation of the mobile terminal 100.

The controller 160 perform a particular function of the mobile terminal 100 according to a command received from the display unit 120, and re-controls or changes the divisional boundary (or the position thereof) of the display regions 122 and 126.

In addition, the controller 160 controls the display unit 120 to display the menu bar 124 according to an external input and pre-set setting information. For example, in a state that the display unit 120 displays a standby screen, when a touch on the standby screen is sensed, the display unit 120 informs the controller 160 accordingly. Upon receiving information on a touched portion from the display unit 120, the controller 160 controls the display unit 120 to display the menu bar 124 based on the pre-set setting information.

Also, when a dragging operation is performed by the user in the standby state, the controller 160 adjusts the display position of the menu bar 124 and partitioning of the display regions 122 and 126 based on the information regarding a touched position and dragging direction received from the display unit 120.

Figure 3:
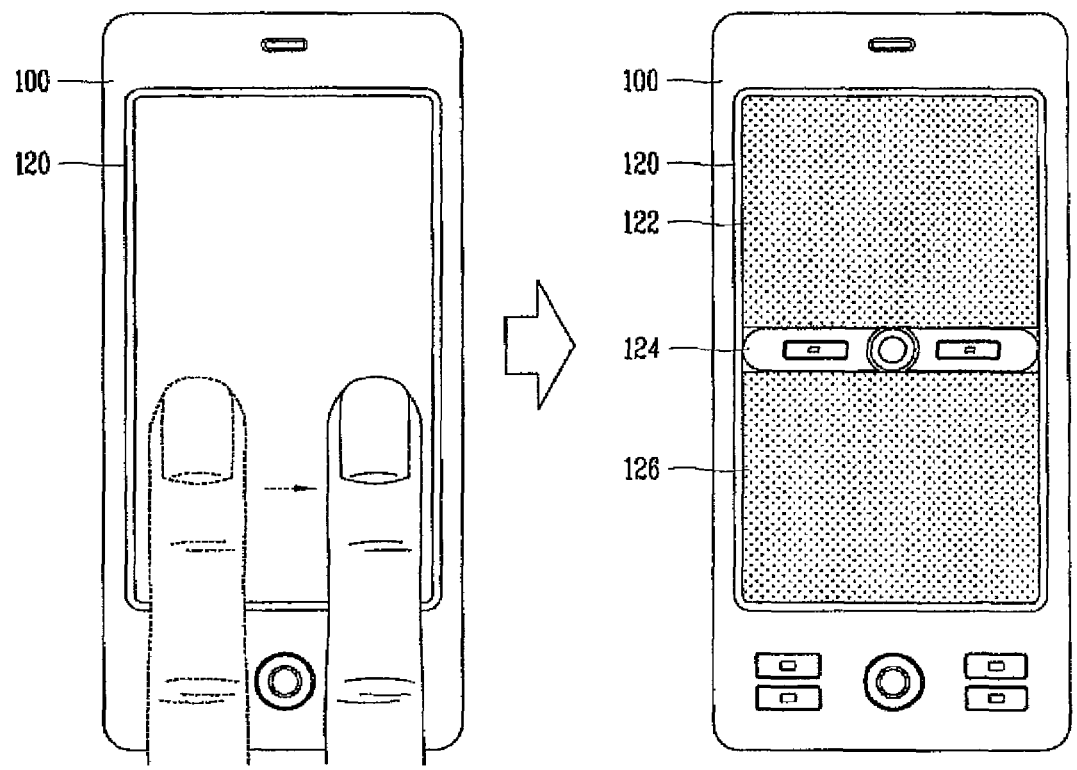
FIG. 3 is a view showing one example of a menu bar displayed according to a drag input in the mobile terminal according to the exemplary embodiment of the present invention.

As shown in FIG. 3, when the user performs a dragging operation (e.g., using one or more fingers) in the horizontal direction on the screen of the display unit 120, the controller 160 determines the touched position as the display position of the menu bar 124 and controls the display unit 120 to display the horizontal menu bar 124 at the touched position. For instance, the user may contact a left portion of the touch screen with his finger and then move (or drag) his finger across the touch screen horizontally, which in turn cause the menu bar 124 to be displayed along the touched line. Further, there may be other ways to display a menu bar at a particular location on the touch screen of the display unit 120. For instance, the user may use three or more fingers and press an area across the touch screen simultaneously, which in turn may cause the menu bar 124 to be displayed along the touched area.

Moreover, the displayed menu bar may be moved on the touch screen. For instance, once the menu bar is displayed, the user can move the position of the menu bar on the screen by contacting the displayed menu bar and dragging it to a desired new position on the touch screen. Other examples are possible.

Figure 4:
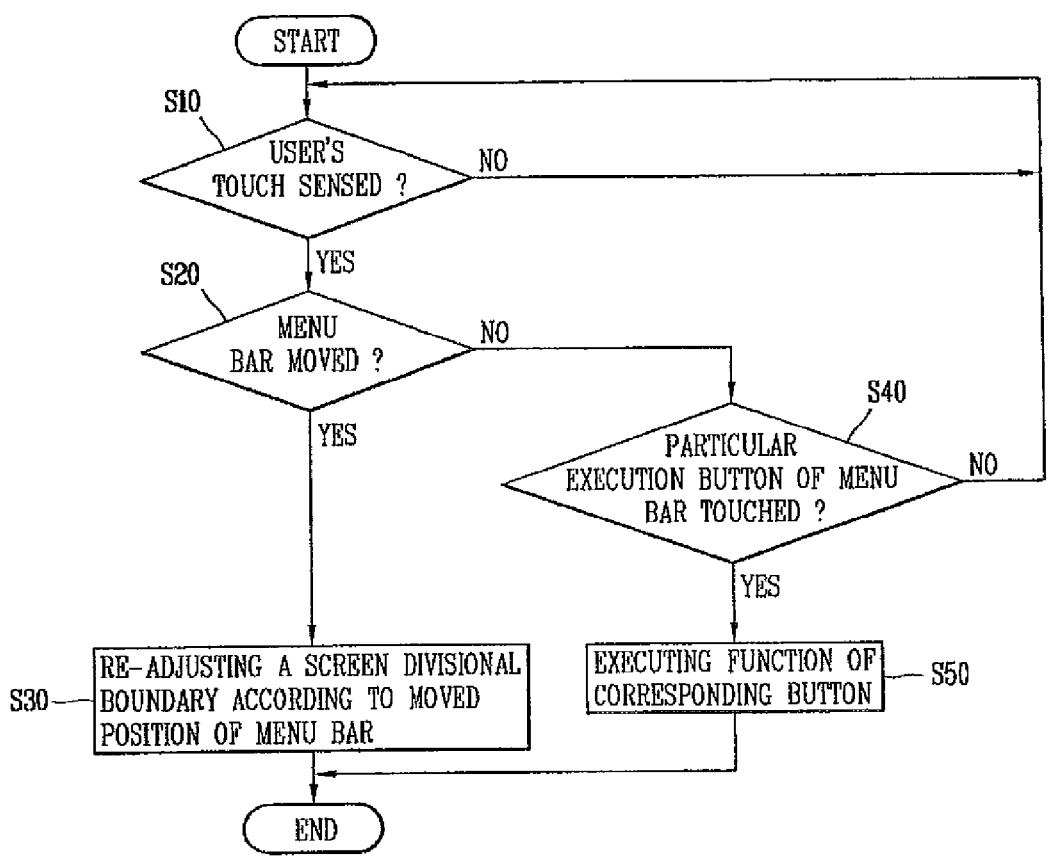
FIG. 4 is a flow chart illustrating the processes of the mobile terminal according to the exemplary embodiment of the present invention.

FIG. 4 is a flow chart illustrating the processes of the mobile terminal according to an exemplary embodiment of the present invention.

The operation of the mobile terminal according to an embodiment of the present invention will now be described with reference to FIGS. 1, 2A, 2B, 4, 5A and 5B.

When a user's touch on the screen of the mobile terminal is sensed, the display unit 120 checks whether the user has moved the menu bar 124 or pressed a particular button 125 of the menu bar 124 (S10).

Figure 5A:
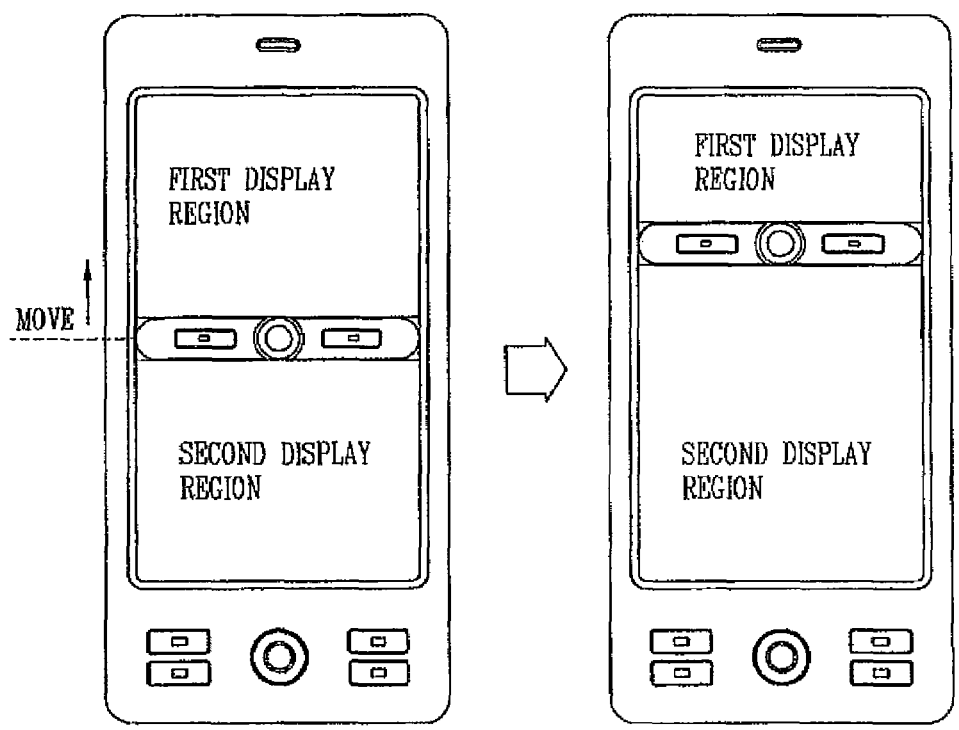
FIGS. 5A and 5B are views showing an example of a movement of a menu bar according to an embodiment of the present invention.

When the user moves the menu bar 124 (S20), the display unit 120 informs the controller 160 accordingly, and the controller 160 controls again the screen-dividing-boundary of the display unit 120 according to the moved position of the menu bar 124 (S30). Namely, because the division boundary between the first and second display regions 122 and 126 moves to the position where the menu bar 124 is positioned, the second display region 126 would be expanded or reduced while the first display region 122 would be relatively reduced or expanded according to the expanded or reduced size of the second display region 126. For example, as shown in FIG. 5A, when the menu bar 124 moves in the direction of the first display region 122, the controller 160 receives corresponding information from the display unit 120. Then, the controller 160 reduces or expands the first and second display regions 122 and 126 according to the movement of the menu bar 124 such that the menu bar 124 is now moved up to a new location on the screen of the mobile terminal.

Figure 5B:
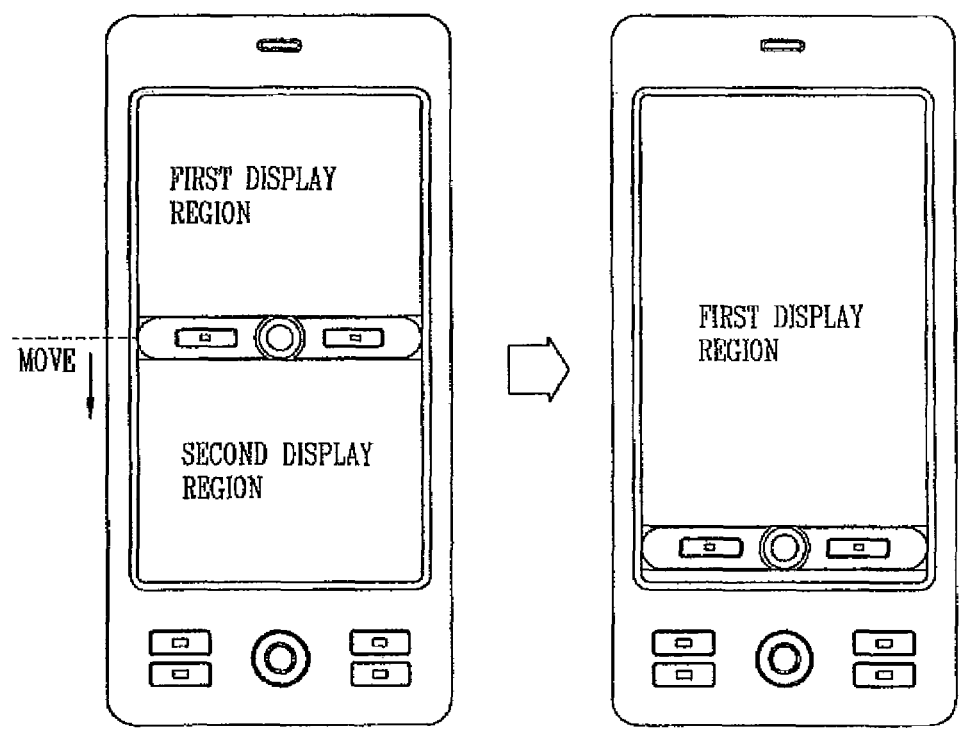

If the menu bar 124, namely, serving as the divisional boundary of the first and second display regions 122 and 126, moves to the bottom of the screen as shown in FIG. 5B, only the first display region 122 remains on the screen while the second display region 126 disappears. The menu bar 124 can be moved to various locations on the screen.

If the user touches the particular button 125 of the menu bar 124 (S40), the display unit 120 informs the controller 160 accordingly. Then, the controller 160 checks the button which has been pressed by the user and executes a function (or menu) of the corresponding button (S50).

Figure 6A:
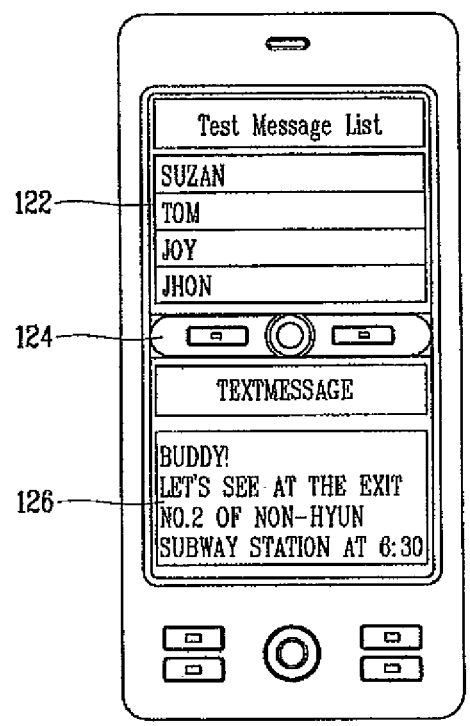
FIGS. 6A and 6B are views showing examples of a screen image displayable on the mobile terminal according to a first exemplary embodiment of the present invention.
Figure 6B:
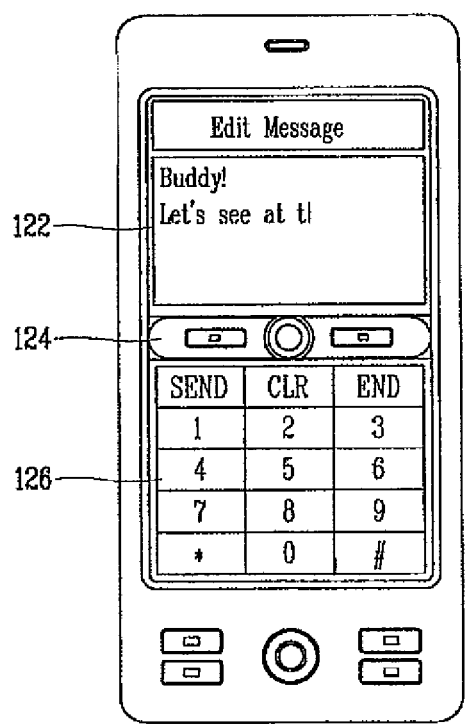

FIGS. 6A and 6B are views showing examples of a screen image of the mobile terminal according to a first exemplary embodiment of the present invention. Specifically, FIGS. 6A and 6B show screen images of the mobile terminal when the particular button 125 selected by the user is a text message service execution button.

As shown in FIG. 6A, when the user touches the text message service execution button 125 of the menu bar 124, the display unit 120 senses it and provides the sensed information to the controller 160. Then, the controller 160 executes the selected text message service and the display unit 120 displays the text message service execution screen image on the first display region 122 under the control of the controller 160. When the user selects a text message storage box on the service execution screen image, the controller 160 outputs a text message list to the first display region 122 of the display unit 120. When one of the text messages on the list displayed on the first display region 122 is selected by the user, the controller 160 controls the display unit 120 to display the selected text message on the second display region 126 as shown.

Thereafter, when the user inputs a corresponding command by manipulating a menu (e.g., menu bar 124 or other menu) to create a return message upon checking the text message, the controller 160 executes a message creation function according to the corresponding command. At this time, the display unit 120 displays the content of the created return message on the first display region 122 under the control of the controller 160 and displays a keypad for inputting the return message on the second display region 126 as shown in FIG. 6B.

Figure 7:
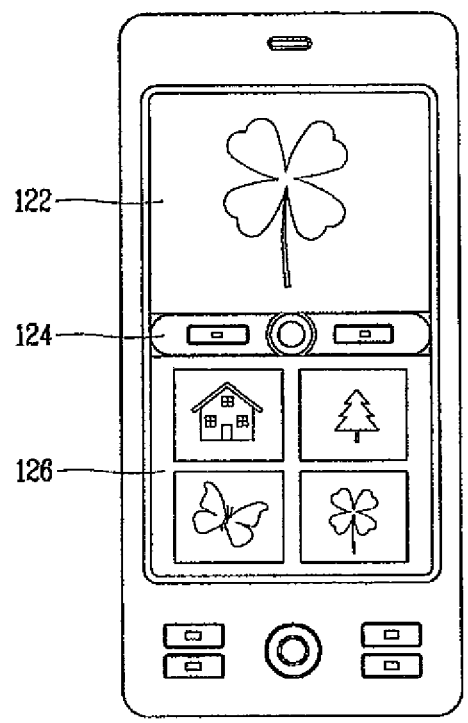
FIG. 7 is a view showing an example of a screen image displayable on the mobile terminal according to a second exemplary embodiment of the present invention.

FIG. 7 is a view showing an example of a screen image of the mobile terminal according to a second exemplary embodiment of the present invention. Specifically, FIG. 7 shows a screen image when the particular button 125 selected by the user is a photo album execution button.

As shown in FIG. 7, when the user touches the photo album execution button 125 of the menu bar 124, the display unit 120 senses it and provides the sensed information to the controller 160. Then, the controller 160 controls the display unit 120 to display a list of photos stored in the memory unit 140 in the form of thumbnail on the second display region 126. In the present exemplary embodiment, the list of photos is displayed in the form of thumbnail, but without being limited thereto, the list of photos can be displayed in the form of a text-type list or other form.

When one of the photos displayed on the second display region 126 is touched, the display unit 120 informs the controller 160 accordingly. The display unit 120 magnifies the selected photo and displays the magnified photo on the first display region 122 under the control of the controller 160 as shown.

Figure 8:
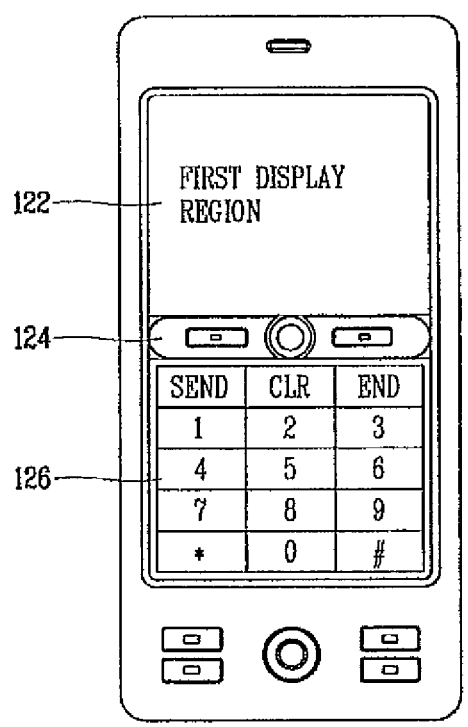
FIG. 8 is a view showing an example of a screen image displayable on the mobile terminal according to a third exemplary embodiment of the present invention.

FIG. 8 is a view showing an example of a screen image of the mobile terminal according to a third exemplary embodiment of the present invention. Specifically, FIG. 8 shows a screen image of the mobile terminal when the particular button 125 selected is an input unit execution button.

As shown in FIG. 8, when the user presses the input unit execution button 125 of the menu bar 124, the display unit 120 senses it and provides the sensed information to the controller 160. Then, the controller 160 executes a function corresponding to the sensed information and the display unit 120 displays a corresponding execution screen image on the second display region 126. In the example, the display unit 120 displays an input unit in the form of keypad or key board on the second display region 126 under the control of the controller 160. Then, the user can input a phone number of a reception side or various characters or command languages through the touch-sensitive input unit displayed in the second display region 126. The first display region 122 may be used to view characters or information input through the input unit displayed in the second display region 126.

Figure 9:
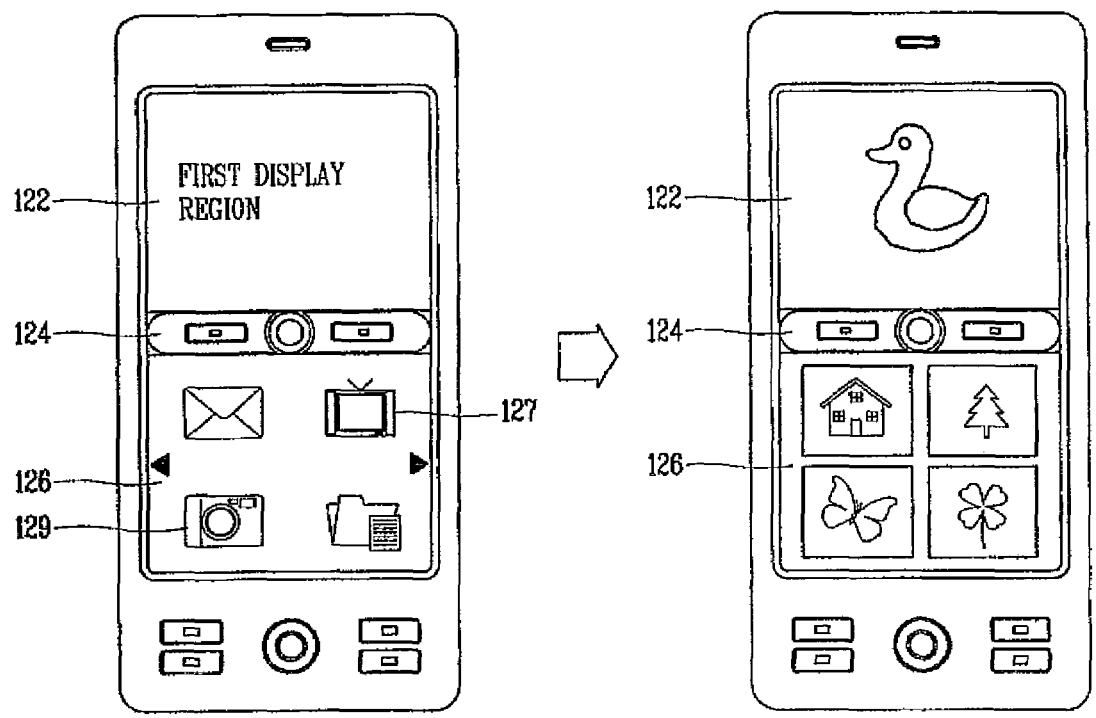
FIG. 9 is a view showing an example of a screen image displayable on the mobile terminal according to a fourth exemplary embodiment of the present invention.

FIG. 9 is a view showing an example of a screen image according to a fourth exemplary embodiment of the present invention. Specifically, FIG. 9 shows a screen image of the mobile terminal when the particular button 125 selected by the user is a multi-task execution button.

As shown in FIG. 9, when the user touches the multi-task execution button 125 of the menu bar 124, the display unit 120 senses it and provides the sensed information to the controller 160. Then, the controller 160 fetches a list of tasks can be available for multi-tasking, and the display unit 120 displays the task list on the second display region 126. In this case, the display unit 120 may arrange to display the task list in the form of text and/or in the form of icons under the control of the controller 160. Subsequently, the user can select multiple tasks to be simultaneously performed from the task list. For example, when the user selects a broadcast viewing 127 and a photo album 129, the controller 160 controls the broadcast receiving unit 130 to receive a broadcast signal, and the display unit 120 displays the broadcast signal on the first display region 122 under the control of the controller 160. Then or at the same time, the controller 160 accesses a photo list stored in the memory unit 140 and the display unit 120 displays the accessed photo list on the second display region 126. In this case, in displaying the photo list, the name of photos or a file name can be displayed in the form of text or thumbnail.

In the present examples, the task list is displayed on the second display region 126, but without being limited thereto, it can be displayed on the first display region 122.

In addition to the execution buttons presented in the above description, may other buttons (or execution keys), such as a button for executing a DMB (Digital Multimedia Broadcasting), a button for displaying lyrics of mp3 music (or foreign language conversation sentences) or an e-book, a button for executing games or Web browsers, etc., can be added to the menu bar 124. In those cases, the first and second display regions 122 and 126 can be effectively utilized to display information associated with such tasks.

Examples of the mobile terminal of the present invention can include, but are not limited to, a mobile phone, a PDA, a computer laptop, a pager, an MP3 player, a smart phone device, or any device including a touch screen.

As so far described, the display device and method of the mobile terminal according to the present invention have the following advantages.

For instance, because the display unit of the touch screen type, which displays the movable menu bar that can be moved to any desired position on the screen, is mounted on the mobile terminal and the size of the divided screens is relatively determined according to the position of the movable menu bar, the large screen display device can be more effectively used.

In addition, because one or more menu buttons (or execution keys) are provided at the movable menu bar, the user can easily execute various functions of the mobile terminal using the movable menu bar.

Further, since the menu bar is movable on the screen of the mobile terminal using a simple action, the mobile terminal is user-friendly and a menu bar can be displayed and easily moved according to the user's need and preference.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display including a touch screen and configured to display a graphical representation of a touch graphical moveable menu bar on the touch screen that partitions the display into first and second display regions and that can be moved by touching and moving the displayed graphical menu bar; and
a controller configured to re-adjust a divisional boundary of the first and second display regions based on a movement of the menu bar and to perform a function on the mobile terminal in accordance with a sensed touching of the touch screen,
wherein the moveable menu bar comprises at least one touch menu execution button configured to execute a particular function on the terminal when touched,
wherein the at least one touch menu execution button on the movable menu bar comprises a photo execution button,
wherein when the photo execution button is touched, the controller is further configured to display a plurality of photos in one of the first and second display regions, and when one of the photos displayed in said one of the first and second display regions is touched, the controller is further configured to magnify and display the selected photo in the other of the first and second display regions and to maintain displaying the plurality of photos in said one of the first and second display regions,
wherein the display is further configured to sense the user touching the touch screen when the menu bar is not displayed on the touch screen, and the controller is further configured to control the display to display the menu bar on the touch screen based on the sensed user touching the touch screen when the menu bar is not displayed on the touch screen,
wherein when the display senses the user touching and dragging the touch screen in a horizontal direction, the controller is further configured to control the display to display the menu bar on the touch screen at a position the user touches and drags the touch screen in the horizontal direction, and
wherein when the display senses the user touching a left portion of the touch screen and then dragging the touch across the touch screen horizontally, the controller is further configured to control the display to display the menu bar on the touch screen along the touched portion of the touch screen.

2. The mobile terminal of claim 1, wherein the at least one touch menu execution button on the movable menu bar comprises a button configured to execute a text message service on the terminal.

3. The mobile terminal of claim 1, wherein the at least one menu execution button on the moveable menu bar comprises a button configured to display a virtual input device including at least one of a keypad and a keyboard on the touch screen.

4. The mobile terminal of claim 1, wherein the at least one menu execution button on the moveable menu bar comprises a multi-task execution button configured to simultaneously perform multiple tasks on the terminal.

5. The mobile terminal of claim 1, wherein the controller is further configured to execute different tasks on the first and second display regions.

6. The mobile terminal of claim 1, wherein the controller is further configured to display a first task on the first display region and a second task associated with the first task on the second display region.

7. A mobile terminal, comprising:
a touch screen including at least first and second display regions and a menu bar; and
a controller configured to position the menu bar on the touch screen to correspond to a movement of the menu bar from a user touching and moving the menu bar so as to divide the touch screen into said first and second display regions,
wherein the menu bar displayed on the touch screen comprises a graphical representation of a touch graphical moveable menu bar that can be moved by touching and moving the displayed graphical menu bar, wherein the menu bar comprises at least one touch menu execution button configured to execute a particular function on the terminal when touched, wherein the at least one touch menu execution button on the movable menu bar comprises a photo execution button, wherein when the photo execution button is touched, the controller is further configured to display a plurality of photos in one of the first and second display regions, and when one of the photos displayed in said one of the first and second display regions is touched, the controller is further configured to magnify and display the selected photo in the other of the first and second display regions and to maintain displaying the plurality of photos in said one of the first and second display regions, wherein the touch screen is further configured to sense the user touching the touch screen when the menu bar is not displayed on the touch screen, and the controller is further configured to control the touch screen to display the menu bar on the touch screen based on the sensed user touching the touch screen when the menu bar is not displayed on the touch screen, wherein when the touch screen senses the user touching and dragging the touch screen in a horizontal direction, the controller is further configured to control the touch screen to display the menu bar on the touch screen at a position the user touches and drags the touch screen in the horizontal direction, and wherein when the touch screen senses the user touching a left portion of the touch screen and then dragging the touch across the touch screen horizontally, the controller is further configured to control the touch screen to display the menu bar on the touch screen along the touched portion of the touch screen.

8. The mobile terminal of claim 7, wherein when the user drags the menu bar to a new position, the controller is further configured to move the menu bar to the new position on the touch screen.

9. The mobile terminal of claim 7, wherein the at least one menu execution button on the menu bar includes a button configured to display a virtual input device including at least one of a keypad and a keyboard on the touch screen.

10. The mobile terminal of claim 7, wherein the at least one menu execution button on the menu bar includes at least one button configured to execute a text message service and a multi-task performing button configured to simultaneously execute multiple tasks on the terminal.

11. The mobile terminal of claim 7, wherein the menu bar horizontally divides the touch screen such that the first and second display regions correspond to upper and lower display regions.

12. The mobile terminal of claim 7, wherein when the user moves the menu bar to one end of the touch screen, the controller is further configured to display only one of the first and second display regions.

13. The mobile terminal of claim 7, wherein the controller is further configured to execute different tasks on the first and second display regions.

14. The mobile terminal of claim 7, wherein the controller is further configured to display an image of a first task on the first display region and an image of a second task associated with the first task on the second display region.

15. A method of controlling a mobile terminal, the method comprising:

sensing, via a display unit including a touch screen, a user touching a menu bar displayed on touch screen of the mobile terminal as a representation of a touch graphical menu bar that can be moved by touching and moving the displayed graphical menu bar on the mobile terminal;

sensing, via the display unit, a touch and drag operation being performed on the menu bar corresponding to a movement of the menu bar;

issuing a command from the display unit to a controller of the mobile terminal indicating the sensed movement of the menu bar;

re-adjusting, via the controller, a divisional boundary of first and second display regions of the touch screen based on the issued command indicating the sensed movement of the menu bar;

executing a function on the display of the terminal when a touch menu execution button on the menu bar is touched;

sensing the user touching the touch screen when the menu bar is not displayed on the touch screen; and displaying the menu bar on the touch screen based on the sensed user touching the touch screen when the menu bar is not displayed on the touch screen, wherein the sensing step senses the user touching and dragging the touch screen in a horizontal direction and the displaying step displays the menu bar on the touch screen at a position the user touches and drags the touch screen in the horizontal direction, and wherein the sensing step senses the user touching a left portion of the touch screen and then dragging the touch across the touch screen horizontally, and the displaying step displays the menu bar on the touch screen along the touched portion of the touch screen.

16. The method of claim 15, further comprising:

sensing, via a controller, the mobile terminal being rotated; and controlling, via the controller, the display unit to rotate and display the menu bar on the touch screen based on the sensed rotation of the mobile terminal.

17. The method of claim 15, wherein the menu bar is only the graphical representation of the touch graphical menu bar and is not a mechanical structured attached to a top of the display.

* * * * *